US008209604B2

(12) United States Patent
Sargent, III et al.

(10) Patent No.: US 8,209,604 B2
(45) Date of Patent: Jun. 26, 2012

(54) MATHEMATICAL EXPRESSION BUILDUP AND BUILDDOWN

(75) Inventors: Murray Sargent, III, Redmond, WA (US); Jennifer P. Michelstein, Kirkland, WA (US); Ethan Joseph Bernstein, Seattle, WA (US); Said Abou-Hallawa, Redmond, WA (US); Isao Yamauchi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 11/229,023

(22) Filed: Sep. 16, 2005

(65) Prior Publication Data

US 2006/0059217 A1 Mar. 16, 2006

Related U.S. Application Data

(63) Continuation-in-part of application No. 10/943,095, filed on Sep. 15, 2004.

(51) Int. Cl.
*G06F 17/24* (2006.01)
*G06F 17/25* (2006.01)
(52) U.S. Cl. ............................ 715/267; 715/268
(58) Field of Classification Search .................. 715/267, 715/268
See application file for complete search history.

(56) References Cited

U.S. PATENT DOCUMENTS

| | | | | |
|---|---|---|---|---|
| 5,067,102 A | * | 11/1991 | Eisenstein | 708/142 |
| 5,189,633 A | | 2/1993 | Bonadio | |
| 5,251,292 A | * | 10/1993 | Martel et al. | 715/236 |
| 5,432,721 A | | 7/1995 | Satoh | |
| 5,469,538 A | * | 11/1995 | Razdow | 345/440 |
| 5,627,914 A | | 5/1997 | Pagallo | |
| 5,682,158 A | | 10/1997 | Edberg et al. | |
| 5,784,071 A | | 7/1998 | Tang et al. | |
| 5,793,381 A | | 8/1998 | Edberg et al. | |
| 5,844,555 A | | 12/1998 | Menaker et al. | |
| 5,901,074 A | * | 5/1999 | Nakano et al. | 708/142 |
| 6,204,782 B1 | | 3/2001 | Gonzalez et al. | |
| 6,549,923 B1 | | 4/2003 | Sudoh | |
| 6,610,106 B1 | * | 8/2003 | Jenks | 715/205 |
| 6,795,838 B1 | * | 9/2004 | Kataoka | 708/160 |
| 6,829,620 B2 | | 12/2004 | Hsing et al. | |
| 6,925,597 B2 | | 8/2005 | Anwar | |
| 6,934,910 B2 | * | 8/2005 | Lange | 715/267 |
| 6,999,082 B2 | | 2/2006 | Nishimura | |
| 7,120,867 B2 | * | 10/2006 | Breuer et al. | 715/239 |

(Continued)

OTHER PUBLICATIONS

Gear, C.W., "Numerical solution of ordinary differential eqautions at a remote terminal", ACM, 1966, pp. 43-49.*

(Continued)

*Primary Examiner* — Doug Hutton, Jr.
*Assistant Examiner* — James Debrow
(74) *Attorney, Agent, or Firm* — Merchant & Gould P.C.

(57) ABSTRACT

Systems and methods for manipulating mathematical expressions in a computer system. A system can include a builddown module programmed to builddown a mathematical expression from a two-dimensional format to a linear format, the builddown module being programmed to associate a special property of the two-dimensional format of the mathematical expression with a corresponding character of the linear format of the mathematical expression. A method can include receiving a request to builddown the mathematical expression from a two-dimensional format to a linear format, building down the mathematical expression to the linear format, and associating a special property of the two-dimensional format of the mathematical expression with a corresponding character of the linear format of the mathematical expression.

15 Claims, 7 Drawing Sheets

U.S. PATENT DOCUMENTS

| | | | |
|---|---|---|---|
| 7,181,068 B2 * | 2/2007 | Suzuki et al. | 382/229 |
| 7,188,115 B2 | 3/2007 | Farn et al. | |
| 2001/0007109 A1 | 7/2001 | Lange | |
| 2003/0056181 A1 | 3/2003 | Marathe | |
| 2004/0015342 A1 * | 1/2004 | Garst | 704/5 |
| 2004/0114258 A1 | 6/2004 | Harris, III et al. | |
| 2004/0117731 A1 | 6/2004 | Blyashov | |
| 2004/0205583 A1 | 10/2004 | Jones et al. | |
| 2004/0210818 A1 | 10/2004 | Jones et al. | |
| 2004/0215647 A1 * | 10/2004 | Farn et al. | 707/101 |
| 2005/0041017 A1 | 2/2005 | de Brebisson | |
| 2006/0001667 A1 * | 1/2006 | LaViola et al. | 345/473 |
| 2006/0005115 A1 | 1/2006 | Ritter et al. | |
| 2006/0059214 A1 | 3/2006 | Sargent, III et al. | |
| 2006/0190474 A1 | 8/2006 | Michelstein et al. | |
| 2006/0190821 A1 * | 8/2006 | Michelstein et al. | 715/538 |
| 2006/0256116 A1 | 11/2006 | Burago et al. | |
| 2006/0274070 A1 | 12/2006 | Herman et al. | |
| 2007/0011515 A1 | 1/2007 | Heydarian et al. | |
| 2007/0033524 A1 | 2/2007 | Michelstein et al. | |
| 2007/0266315 A1 * | 11/2007 | Bernardin et al. | 715/538 |
| 2008/0077854 A1 | 3/2008 | Alabi | |

OTHER PUBLICATIONS

"Character Encoding", 2002, pp. 1-4.*

Anthony et al., "Evaluation of Multimodal Input for Entering Mathimatical Equations on the Computer", 2005, ACM, pp. 1184-1187.*

Bruhn et al., "Displaying Mathematics in a Web Browser Using MathML and SVG", Mid-South College Computing Conference, 2004, pp. 97-106.*

Zhao et al., Math Information Retrieval: User Requirments and Prototype Implementation, ACM, 2008.*

Weideman et al., "A MATLAB Differentiation Matrix Suite", ACM, 2001, pp. 465-519.*

Trevor Murphy, "Multiple Solutions for Digitizing Equations for Students", ACM, 2005, pp. 244-246.*

Suzuki et al.,"INFTY—An Integrated OCR System for Mathematical Documents", ACM, 2003, pp. 95-104.*

Oetiker, T. et al., "The Not So Short Introduction to LATEX 2ϵ," Version 4.14, 145 pages (Copyright 1995-2002).

"PS Technical Word Processor," *Scroll Systems, Inc.*, Front page, Copyright page, Contents (iii-xii), Chapter 13 (13-1-13-20) (Copyright 1985, 1986, 1987).

"MathType Mathematical Equation Editor User Manual," 144 pages (Copyright 1987-2001).

"Mathematics on the Web," *MacKichan Software, Inc.*, 19 pages (Dec. 2001).

"Natural Mathematical Notation," http://www.scientificword.com/nmn.html, *MacKichan Software, Inc.*, 2 pages (Copyright 1998).

Sargent III, M., "Unicode Nearly Plain-Text Encoding of Mathematics," *Microsoft Corporation*, 16 pages (Jul. 2, 2004).

Sargent III, M. "Unicode, Rich Text, and Mathematics," *Microsoft Corporation*, 19 pages (Aug. 30, 1995).

ScienceWord Manual, mk:@MSITStore:C:\temp\Temporary%20Directory%201%20for%20SW31Manual.zip\S..., Chapter One, Chapter Four (Sections 1-3, 5-10), 27 pages (Date last printed Sep. 29, 2004).

DuCharme, B., Math and XSLT—from XML.com, pp. 1-6, Jul. 5, 2001.

Mathematical Markup Language (MathML) Version 2.0 (Second Edition); W3C Recommendation Oct. 21, 2003, Copyright © 1998-2003 W3C® (MIT, ERCIM, Keio), pp. 1-541.

Microsoft, "Word 2000 Screenshots," pp. 1-6, Dec. 31, 1999.

"New Maintenance Release: LyX 1.3.4 Released," Retrieved from the Internet: URL:http://www.lyx.org/News, pp. 1-28 (Feb. 19, 2004).

"The LyX User's Guide", Retrieved from the Internet: URL:ftp://ftp.lyx.org/pub/lyx/stable/1.3.x/lyx-1.3.4.tar.gz\lyx-1.3.4\lib\doc\UserGuide.txt, pp. 1-76 (Feb. 2004).

Beeton et al., *Unicode Support for Mathematics*, http://www.unicode.org/reports/tr25/index.html, Unicode Technical Reports #25, Unicode and Mathematics, Unicode, Inc., pp. 1-45, © 2001-2003.

*C0 Controls and Basic Latin, Range: 0000-007F*, The Unicode Standard 4.1, Unicode, Inc., pp. 420-425, © 1991-2005.

HTML 3.0 Draft (Expired!) Materials; Published 1995; pp. 1.

HTML Math; Published 1995; pp. 1-4.

Ion et al., Mathematical Markup Language (MathML) Frequently Asked Questions (FAQ), Copyright 1998, 7 pgs.

James Jones, "Using the Equation Editor," http://people.richland.edu/james/editor/editor.pdf, 9 pages (Aug. 10, 2003).

Lee Anne Phillips; Special Edition Using XML; Published Aug. 25, 2000; Chapter 24 Secion 2 (pp. 1-16), Chapter 24 Section 10 (pp. 1-8), Copyright Page for proof of priority date (pp. 1-2).

*Mathematical Alphanumeric Symbols, Range: 1D400-1D7FF*, The Unicode Standard 4.1, Unicode, Inc., pp. 969-995, © 1991-2005.

MathMagic Personal Edition & MathMagic Pro Edition User Guide for Macintosh, Version 4.2, pp. 1-100 (Dec. 2003).

Smithies, S. et al., A Handwriting-Based Equation Editor, *Proceedings of Graphics Interface '99*, Kingston, Ontario, pp. 84-91 (Jun. 1999).

U.S. Office Action cited in U.S. Appl. No. 10/943,095 mailed Feb. 21, 2008.

U.S. Final Office Action cited in U.S. Appl. No. 10/943,095 mailed Sep. 17, 2008.

U.S. Office Action cited in U.S. Appl. No. 10/943,095 mailed May 7, 2009.

U.S. Office Action cited in U.S. Appl. No. 11/067,378 mailed Apr. 30, 2007.

U.S. Final Office Action cited in U.S. Appl. No. 11/067,378 mailed Nov. 16, 2007.

U.S. Office Action cited in U.S. Appl. No. 11/067,378 mailed May 14, 2008.

U.S. Final Office Action cited in U.S. Appl. No. 11/067,378 mailed Feb. 4, 2009.

U.S. Office Action cited in U.S. Appl. No. 11/067,540 mailed May 1, 2007.

U.S. Final Office Action cited in U.S. Appl. No. 11/067,540 mailed Nov. 14, 2007.

U.S. Office Action cited in U.S. Appl. No. 11/067,540 mailed Aug. 6, 2008.

U.S. Final Office Action cited in U.S. Appl. No. 11/067,540 mailed Feb. 23, 2009.

U.S. Office Action cited in U.S. Appl. No. 11/196,801 mailed Sep. 18, 2008.

U.S. Final Office Action cited in U.S. Appl. No. 11/196,801 mailed Apr. 1, 2009.

* cited by examiner

MATHEMATICAL EXPRESSION BUILDUP AND BUILDDOWN

RELATED APPLICATION

This application is a continuation-in-part of U.S. patent application Ser. No. 10/943,095, filed Sep. 15, 2004 and entitled "Systems and Methods for Automated Equation Buildup," the entirety of which is hereby incorporated by reference.

BACKGROUND

The ability to efficiently input mathematical expressions into word processing applications and html editors is becoming increasingly important as more technical information is distributed in word-processed and web page formats. Programs such as TeX and LaTeX allow a user to typeset and print mathematical expressions in a format that is portable across different computing environments. However, such programs are complicated and require the user to have special knowledge of how the programs work before the user can input, typeset, and print expressions.

Word processor programs are typically bundled with an editor that allows a user to create and edit expressions within the word-processing environment. One example of such an editor is Equation Editor 3.0, which is distributed by Microsoft Corporation of Redmond, Wash. These types of equation editors are typically WYSIWYG editors that require users to select among various toolbar icons to develop two-dimensional expressions. However, the selection of toolbar icons can be less efficient for experienced users who frequently enter complicated and lengthy expressions.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments described herein relate to systems and methods for the manipulation of mathematical expressions entered into a computer system.

One aspect relates to an application for a computer system, the application including an input module programmed to accept input of a mathematical expression, and a builddown module programmed to builddown the mathematical expression from a two-dimensional format to a linear format, wherein the builddown module is programmed to associate a special property of the two-dimensional format of the mathematical expression with a corresponding character of the linear format of the mathematical expression. The application also includes a formatting module programmed to format the mathematical expression upon building the mathematical expression back up from the linear format to the two-dimensional format, wherein the formatting module is programmed to apply the special property to the two-dimensional format Another aspect relates to method for manipulating a mathematical expression entered into a computer system, the method including: receiving a request to builddown the mathematical expression from a two-dimensional format to a linear format; building down the mathematical expression to the linear format; and associating a special property of the two-dimensional format of the mathematical expression with a corresponding character of the linear format of the mathematical expression.

Another aspect relates to computer-readable medium having computer-executable instructions for performing steps including: receiving a request to builddown the mathematical expression from a two-dimensional format to a linear format; building down the mathematical expression to the linear format; and associating a special property of the two-dimensional format of the mathematical expression with a corresponding character of the linear format of the mathematical expression.

DESCRIPTION OF THE DRAWINGS

Reference will now be made to the accompanying drawings, which are not necessarily drawn to scale, and wherein.

DETAILED DESCRIPTION

Embodiments will now be described more fully hereinafter with reference to the accompanying drawings. This invention may, however, be embodied in many different forms and should not be construed as limited to the embodiments set forth herein; rather, these embodiments are provided so that this disclosure will be thorough and complete. Like numbers refer to like elements throughout.

Embodiments described herein relate to systems and methods for the manipulation of mathematical expressions entered into a computer system.

As used herein, the phrase "linear format" refers to a linear text-based representation of an expression using a linear notation such as, for example, TeX or LaTeX. An example of an expression in linear format is "x=½" ("x is equal to one-half").

The phrase "two-dimensional format" refers to a format in which an expression is represented using a non-linear notation such as, for example, Polish prefix format. Polish prefix format is a format including, for example, a function start character followed by a numerator, a separator character, a denominator, and an end-function delimiter. An example of an expression in two-dimensional format is $$x = \frac{1}{2}$$

("x is equal to one-half").

An expression can be converted from linear format to two-dimensional format and vice versa. For example, embodiments disclosed herein including systems and methods for converting mathematical expressions from linear format to two-dimensional format, and from two-dimensional format to linear format.

Figure 1:
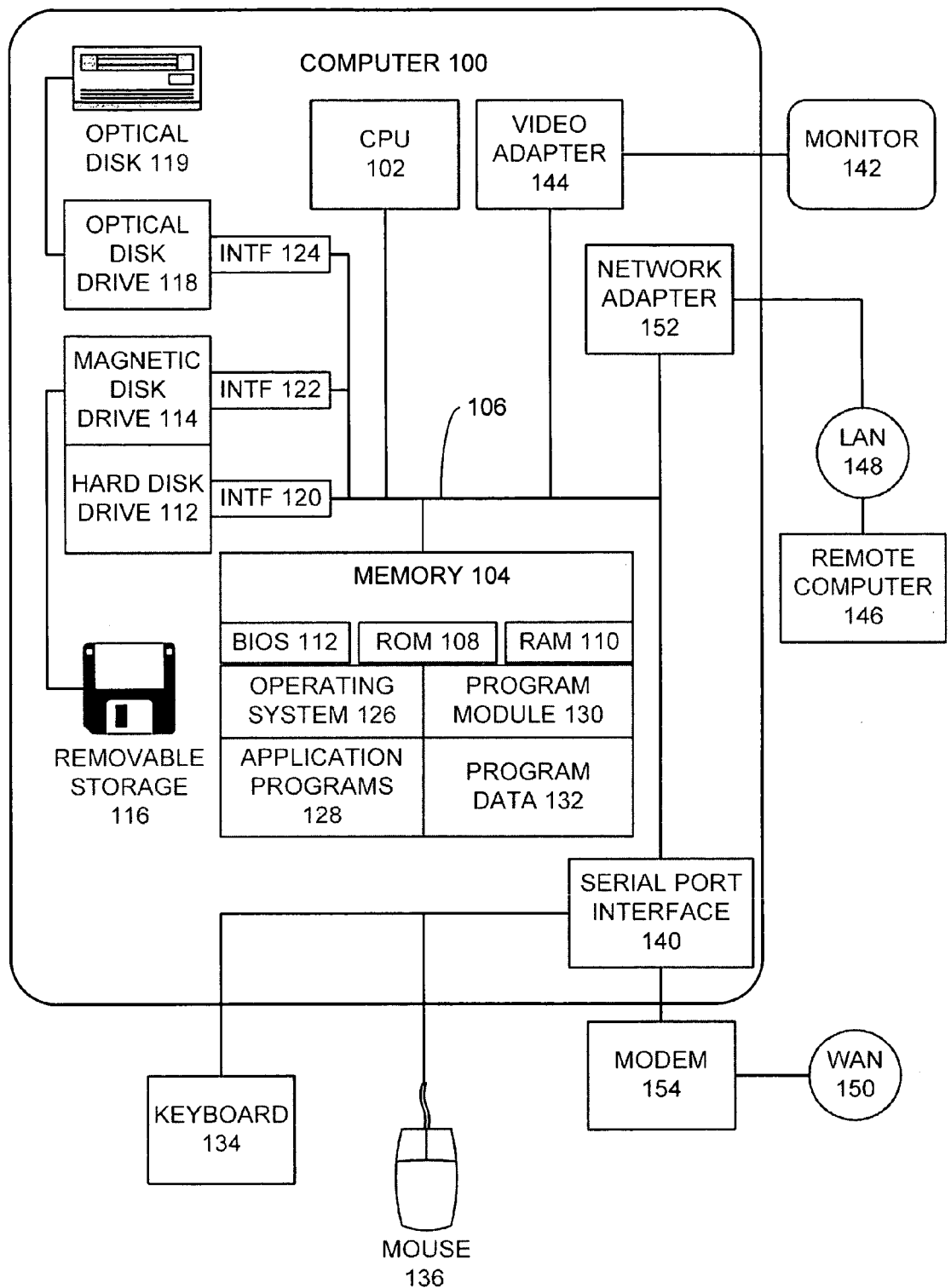
FIG. 1 illustrates an example general purpose computing system.

Referring now to FIG. 1, an example computer system 100 is illustrated. The computer system 100 illustrated in FIG. 1 can take a variety of forms such as, for example, a desktop computer, a laptop computer, and a hand-held computer. In addition, although computer system 100 is illustrated, the systems and methods disclosed herein can be implemented in various alternative computer systems as well.

The system 100 includes a processor unit 102, a system memory 104, and a system bus 106 that couples various system components including the system memory 104 to the processor unit 102. The system bus 106 can be any of several types of bus structures including a memory bus, a peripheral bus and a local bus using any of a variety of bus architectures. The system memory includes read only memory (ROM) 108 and random access memory (RAM) 110. A basic input/output system 112 (BIOS), which contains basic routines that help transfer information between elements within the computer system 100, is stored in ROM 108.

The computer system 100 further includes a hard disk drive 112 for reading from and writing to a hard disk, a magnetic disk drive 114 for reading from or writing to a removable magnetic disk 116, and an optical disk drive 118 for reading from or writing to a removable optical disk 119 such as a CD ROM, DVD, or other optical media. The hard disk drive 112, magnetic disk drive 114, and optical disk drive 118 are connected to the system bus 106 by a hard disk drive interface 120, a magnetic disk drive interface 122, and an optical drive interface 124, respectively. The drives and their associated computer-readable media provide nonvolatile storage of computer readable instructions, data structures, programs, and other data for the computer system 100.

Although the example environment described herein can employ a hard disk 112, a removable magnetic disk 116, and a removable optical disk 119, other types of computer-readable media capable of storing data can be used in the example system 100. Examples of these other types of computer-readable mediums that can be used in the example operating environment include magnetic cassettes, flash memory cards, digital video disks, Bernoulli cartridges, random access memories (RAMs), and read only memories (ROMs).

A number of program modules can be stored on the hard disk 112, magnetic disk 116, optical disk 119, ROM 108, or RAM 110, including an operating system 126, one or more application programs 128, other program modules 130, and program data 132.

A user may enter commands and information into the computer system 100 through input devices such as, for example, a keyboard 134, mouse 136, or other pointing device. Examples of other input devices include a toolbar, menu, touch screen, microphone, joystick, game pad, pen, satellite dish, and scanner. These and other input devices are often connected to the processing unit 102 through a serial port interface 140 that is coupled to the system bus 106. Nevertheless, these input devices also may be connected by other interfaces, such as a parallel port, game port, or a universal serial bus (USB). An LCD display 142 or other type of display device is also connected to the system bus 106 via an interface, such as a video adapter 144. In addition to the display 142, computer systems can typically include other peripheral output devices (not shown), such as speakers and printers.

The computer system 100 may operate in a networked environment using logical connections to one or more remote computers, such as a remote computer 146. The remote computer 146 may be a computer system, a server, a router, a network PC, a peer device or other common network node, and typically includes many or all of the elements described above relative to the computer system 100. The network connections include a local area network (LAN) 148 and a wide area network (WAN) 150. Such networking environments are commonplace in offices, enterprise-wide computer networks, intranets, and the Internet.

When used in a LAN networking environment, the computer system 100 is connected to the local network 148 through a network interface or adapter 152. When used in a WAN networking environment, the computer system 100 typically includes a modem 154 or other means for establishing communications over the wide area network 150, such as the Internet. The modem 154, which can be internal or external, is connected to the system bus 106 via the serial port interface 140. In a networked environment, program modules depicted relative to the computer system 100, or portions thereof, may be stored in the remote memory storage device. It will be appreciated that the network connections shown are examples and other means of establishing a communications link between the computers may be used.

The embodiments described herein can be implemented as logical operations in a computing system. The logical operations can be implemented (1) as a sequence of computer implemented steps or program modules running on a computer system and (2) as interconnected logic or hardware modules running within the computing system. This implementation is a matter of choice dependent on the performance requirements of the specific computing system. Accordingly, the logical operations making up the embodiments described herein are referred to as operations, steps, or modules. It will be recognized by one of ordinary skill in the art that these operations, steps, and modules may be implemented in software, in firmware, in special purpose digital logic, and any combination thereof without deviating from the spirit and scope of the present invention as recited within the claims attached hereto. This software, firmware, or similar sequence of computer instructions may be encoded and stored upon computer readable storage medium and may also be encoded within a carrier-wave signal for transmission between computing devices.

Figure 2:
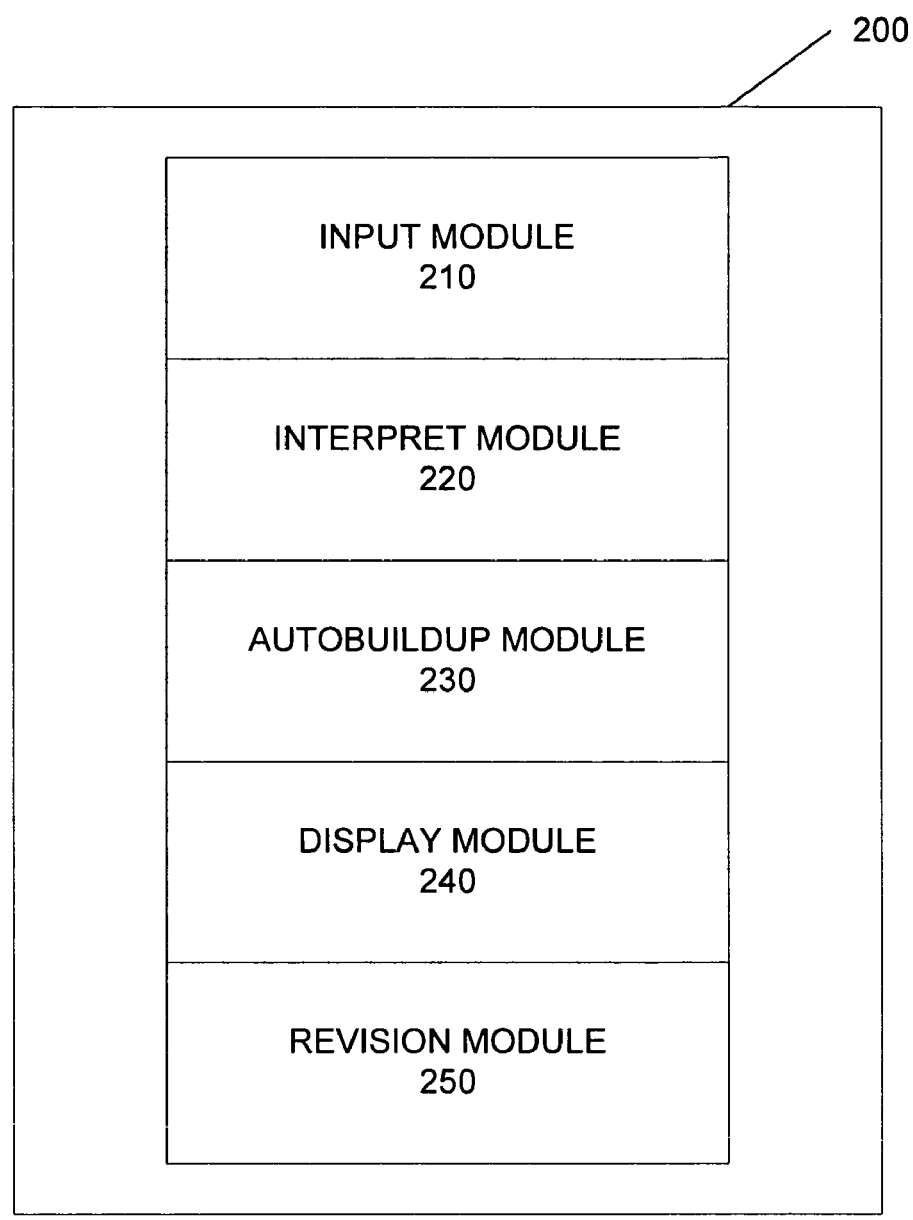
FIG. 2 illustrates an example system for automatically building up a portion of an expression.

Referring now to FIG. 2, an example system 200 for automatically building up a portion of a mathematical expression is shown. System 200 includes an input module 210, an interpret module 220, an autobuildup module 230, a display module 240, and a revision module 250. System 200 can be, for example, an application running on computer system 100 described above.

The input module 210 allows a user to input an expression into system 200. For example, the user can input an expression using input devices such as keyboard 134 and/or mouse 136 described above. In one embodiment, the input module 210 allows the user to input the expression using a linear format notation. Examples of linear format notations include TeX and LaTeX. Other linear format notations can also be used.

For example, in one embodiment, input module 210 accepts input of an expression using a Linear Format notation similar to that incorporated into the application PS Technical Word Processor offered by Scroll Systems, Inc. and described in M. Sargent III, "Unicode Nearly Plain-Text Encoding of Mathematics," 26th Internationalization & Unicode Conference, San Jose, Calif. (September 2004). Linear Format notation is similar to that of TeX and LaTeX, but is a simplified notation that is similar to that interpreted by computer language compilers.

For example, input module 210 can accept input of the following Expression A in linear format:

$$y=a/(b+c)+d \quad\quad\quad (A)$$

Once the user begins to enter the expression in linear format, interpret module 220 interprets the input to identify when a portion of the expression can automatically be builtup into two-dimensional format.

Buildup generally occurs when the user enters a character that forces the text preceding the character to be an unambiguous linear representation of a built-up expression as defined by an active linear format grammar (e.g., TeX, LaTeX, Linear Format). The decision regarding whether a portion of an expression can be builtup is based on an analysis of the most recently entered character and its precedence relative to the operand preceding the character. Generally, each character is checked to determine what buildup can occur in view of the character. For example, if a user types an operand and then types a character that is separate from the operand, autobuildup may occur if the precedence of the character is less than or equal to that of the preceding character. For example, operators such as the plus "+" symbol can cause autobuildup if a preceding operator is a division "/" symbol.

The following examples illustrate how interpret module 220 can be configured to identify when buildup of a portion of an expression can occur. Linear Format is used for the examples. However, other linear format grammars (e.g., TeX, LaTeX) can also be used in a similar manner.

To identify a buildup point, the interpret module 220 examines each character typed by the user. A precedence-oriented technique is used to determine when autobuildup is to occur. For example, in one embodiment, operators in the Linear Format grammar have the precedences given in the following Table 1.

TABLE 1

Operator Precedence

| Operator | Precedence |
|---|---|
| Carriage Return | 0 |
| "(" or "[" or "{" or "<" | 1 |
| ")" or "]" or "}" or ">" | 2 |
| Vertical Tab | 3 |
| Other Unicode math operators (i.e., those not listed in other precedence levels in Table 1) | 4 |
| Fractions ("/" and atop) | 5 |
| √ or ∛ or ∜ or operator indicating enclosure of operand in a rectangle or operator indicating conversion of operand to an array | 6 |
| Unicode integrals, summation, product, and other nary ops | 7 |
| Subscript or superscript | 8 |
| Diacritics or factorials | 9 |

The operator precedence provided in Table 1 is illustrative, and changes to the precedence can be made.

When examining an input to determine whether or not to trigger autobuildup, the interpret module 220 first checks for conversions to/from math italic. If the character typed is an ASCII or Greek alphabetic with a math italic counterpart, then the character is translated to the math italic version. If the character is subscript "_", superscript "^", or space, and the preceding character is a math italic and still more characters precede that character in the expression, then a span of math italics is compared to a dictionary of function names. If found, the name is translated back to ordinary text (e.g., "sin" is translated back to "sin").

If no such translation is made, interpret module 220 starts at the beginning of the current argument if the insertion point (IP) is inside a built-up function, or the start of the entire expression or carriage return preceding the IP, whichever is closest to the IP.

Next, the choice for possible autobuildup is narrowed by advancing to the first major buildup operator, (i.e., an operator other than one of ")" or "]" or "}" or ">"). If such an operator is found before getting back to the IP, then the range is expanded backward to include the numerator for a fraction or the scriptbase for a subscript "_" or superscript "^" symbol. Then buildup is attempted on the text in this range.

Specifically, interpret module 220 scans this range, pushing simple operands onto a rich-text string stack and operators onto an operator stack. Autobuildup of an expression is triggered when the operator immediately following the expression is a ")" or "]" or "}" or ">", or when the operator is not a "(" or "[" or "{" or "<" and one of the following conditions is true: (i) precedence of the operator is less than that of the previous operator; or (ii) precedences of the operator and the previous operator both equal 4, 5, or 7.

In some embodiments, if a change is made inside an argument of a builtup function (i.e., the IP is within a portion of an expression that has already been builtup), analysis by interpret module 220 for determining when to trigger autobuildup can be restricted the argument that is being edited. This restriction can simplify the analysis performed by the interpret module 220 and thereby increase processing efficiency. In other embodiments, the interpret module 220 can be configured to analyze the entire expression regardless of whether a builtup argument is edited.

In one example illustrative of autobuildup, interpret module 220 interprets Expression A above and identifies when a portion of Expression A can be builtup. For Expression A, the interpret module 220 would trigger autobuildup upon entry by the user of a space after the left parenthesis ")" during input of Expression A. This portion of Expression A is illustrated as Expression A' below:

$$y=a/(b+c) \quad\quad\quad (A')$$

The following pseudocode illustrates one example of how interpret module 220 can interpret input by the user of portion Expression A' of Expression A to identify when autobuildup can be triggered.

| Input by User to Input Module | Action(s) by Interpret Module |
|---|---|
| a | "a" goes into backing store |
|   | Translate "a" to math italic "*a*" |
|   | Attempt to trigger automatic buildup, but fail |
| / | "/" goes into backing store |
|   | Attempt to trigger automatic buildup, but fail |
| ( | "(" goes into backing store |
|   | Attempt to trigger automatic buildup, but fail |
| b | "b" goes into backing store |
|   | Translate "b" to math italic "*b*" |
|   | Attempt to trigger automatic buildup, but fail |
| + | "+" goes into backing store |
|   | Attempt to trigger automatic buildup, but fail |

| Input by User to Input Module | Action(s) by Interpret Module |
|---|---|
| c | "c" goes into backing store |
|  | Translate "c" to math italic "c" |
|  | Attempt to trigger automatic buildup, but fail |
| ) | ")" goes into backing store |
|  | Attempt to trigger automatic buildup, but fail |
| Space | Trigger automatic buildup successfully |

As illustrated in the pseudocode provided above, autobuildup is not always successful upon the interpret module 220 identifying one of the predetermined characters that signifies an autobuildup point. For example, for Expression A', interpret module 220 does not trigger autobuildup upon entry of the plus symbol "+" because at that point in the entry of Expression A no portion of the expression can be builtup into two-dimensional format because there is no previous operator having a greater precedence. In addition, interpret module 220 does not trigger autobuildup upon entry of the left parenthesis "(" because additional information may be entered that would be needed before buildup of a portion of Expression A can occur. However, upon entry of the space after the left parenthesis "(", interpret module 220 can trigger autobuildup of portion Expression A' of Expression A because the character immediately following the space is one of ")" or "]" or "}" or ">" (see precedence value 2 in Table 1 above).

As noted in the above pseudocode, each entered character is placed in a backing store. The backing store is a persistent storage space from which typed data can be stored and retrieved. In addition, as illustrated by the above pseudocode, the interpret module 220 can also perform some aspects of formatting of the expression such as, for example, conversion of variables into math italic format.

Once the interpret module 220 triggers autobuildup, autobuildup module 230 attempts to convert at least a portion of the expression into two-dimensional format. For example, when interpret module 220 triggers autobuildup for portion Expression A' of Expression A, autobuildup module 230 converts portion Expression A' of Expression A into two-dimensional format as illustrated by Expression B' below.

$$y = \frac{a}{b+c} \tag{B'}$$

The following pseudocode illustrates one example embodiment of how autobuildup module 230 can build Expression B' from Expression A'.

Push math italic "a" onto (rich-text) string stack
Push "/" onto operator stack
Push "(" onto operator stack
Push math italic "b" onto string stack
Push "+" onto operator stack
Push math italic "c" onto string stack
")" causes "b + c" to be concatenated on string stack
"Space" causes parenthesis "(" and ")" to be removed and fraction to be builtup In one embodiment, autobuildup module 230 performs buildup using a precedence-sensitive expression analysis similar to that used by computer language compilers. In addition, autobuildup module 230 can further format the expression as desired. For example, as illustrated by Expression B', autobuildup module 230 formats the expression by removing the parenthesis "(" and ")" and the space after the left parenthesis "(" upon autobuildup.

Display module 240 displays the portion of the expression that has been builtup in two-dimensional format for the user using a display device such as LCD display 142 described above. The display device 240 also displays any portion of the expression that has been entered but not yet builtup in linear format.

After automatic buildup of a portion of an expression, the input module 210 continues to allow input of the expression in linear format, and the interpret module 220 continues to interpret the input. For example, for Expression A, once Expression A' has automatically been builtup, the user can continue to enter the remaining portion of Expression A. Since no further buildup is necessary for the remaining portion of Expression A ("+d"), the display module 240 displays the entire Expression A in two-dimensional format after the remaining portion of Expression A has been inputted into system 100 as Expression B below.

$$y = \frac{a}{b+c} + d \tag{B}$$

The revision module 250 allows the user to edit the expression. The user can edit the expression while the expression is in linear format or in two-dimensional format. As the user edits the expression, the interpret module 220 continues to monitor the input to determine if additional portions of the expression can be automatically builtup into two-dimensional format.

Another example illustrative of autobuildup is provided by Expression C shown in two-dimensional format below.

$$y = \frac{a}{b^2 + c^2} \tag{C}$$

As input from the user of Expression C in linear format is accepted by input module 210, interpret module 220 examines each character to determine when to trigger autobuildup. As the user enters the plus "+" sign in the denominator of Expression C (i.e., when the user has entered "y=a/(b^2+"), the interpret module 220 triggers buildup of a portion of Expression C by autobuildup module 230, illustrated as Expression C' below.

$$y=a/(b^2+ \tag{C'}$$

Specifically, the superscript for variable "b" is builtup because the precedence value of the plus "+" sign is less than that of the superscript "^" sign. See Table 1 above. However, the entire denominator is not yet builtup because the denominator has not yet been unambiguously defined.

Next, when the user has entered the right parenthesis ")" (i.e., the user has entered "y=a/(b^2+c^2)"), the superscript for variable "c" is builtup as shown in Expression C" below.

$$y=a/(b^2+c^2) \tag{C''}$$

Finally, when the user enters a space or carriage return after the right parenthesis ")", the denominator of Expression C is builtup as shown as Expression C above.

Figure 3:
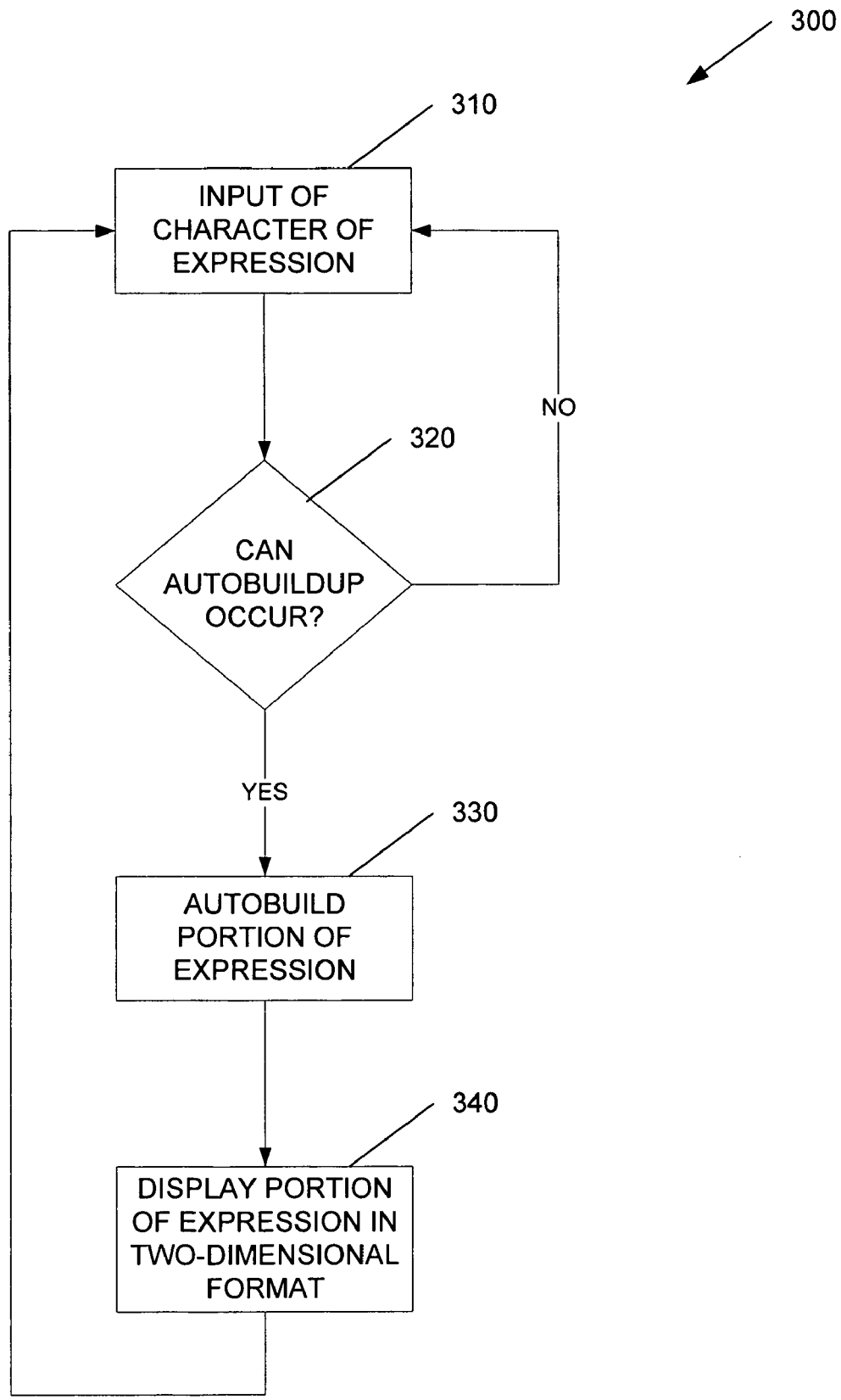
FIG. 3 illustrates an example method for automatically building up a portion of an expression.

Referring now to FIG. 3, an example method 300 is shown for automatically building up an expression as a user inputs the expression into a computer system. At operation 310, the user is allowed to begin input of the expression in linear format. As each character of the expression is entered, control is passed to operation 320, where a determination is made as to whether or not autobuildup can occur on a portion of the expression that has been entered using, for example, the precedence buildup logic described above. If autobuildup can occur, control is passed to operation 330. Otherwise, if autobuildup cannot occur, control is passed back to operation 310 and input of the expression continues.

At operation 330, a portion of the expression is builtup in two-dimensional format. Next, in operation 340, the built-up portion of the expression is displayed in the two-dimensional format. Finally, control is passed back to operation 310 and input of the expression in linear format continues.

Figure 4:
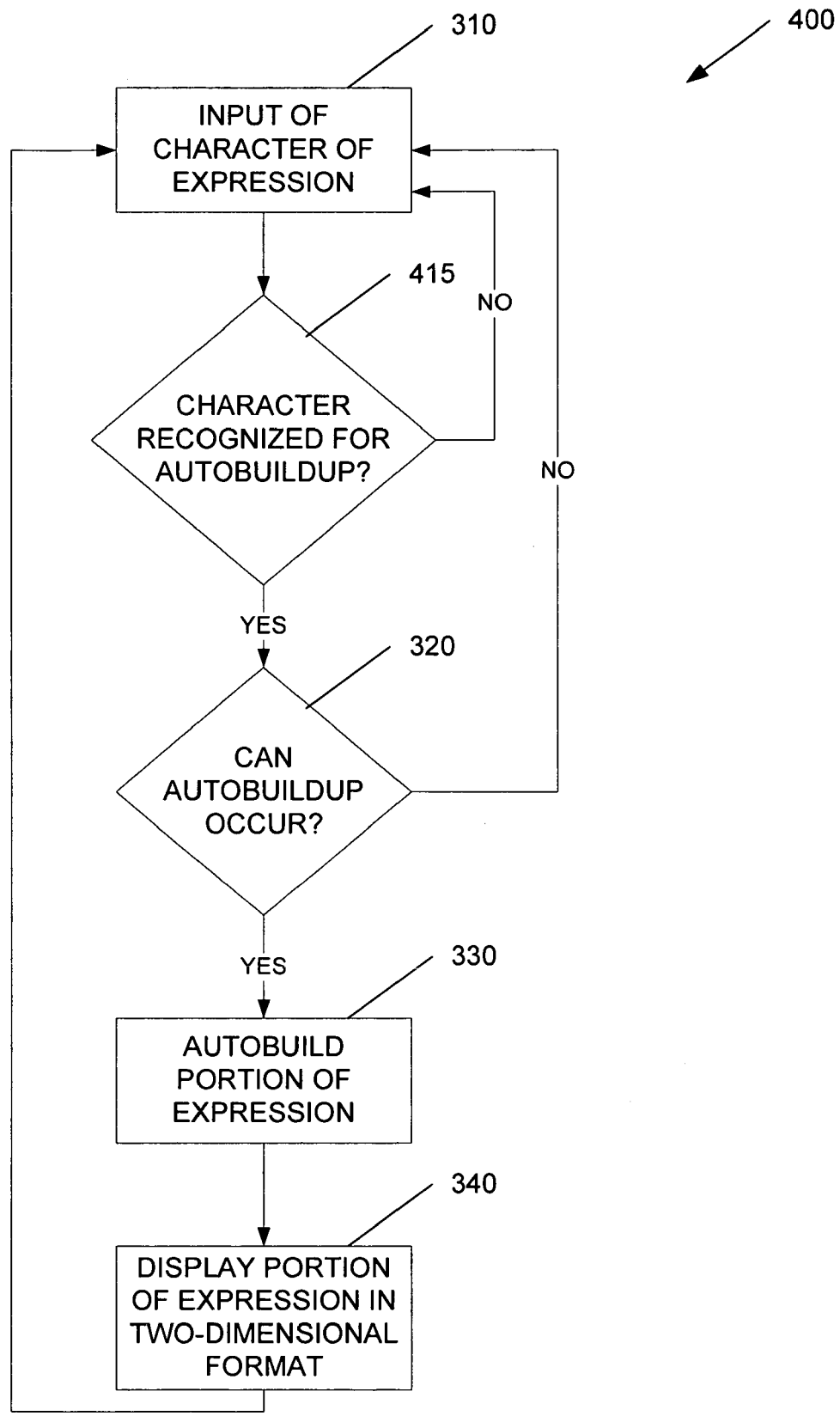
FIG. 4 illustrates another example method for automatically building up a portion of an expression.

Referring now to FIG. 4, another example method 400 is shown for automatically building up an expression. Method 400 is similar to method 300 and includes operations 310, 320, 330, and 340. However, method 400 also includes operation 415 positioned between entry operation 310 and buildup determination operation 320. Operation 415 examines the input to look for predetermined characters that signal that buildup can occur. Examples of such characters include: right parenthesis ")", binary operators, any punctuation, tab, enter, and space. If any of these characters are entered, operation 415 passes control to operation 320 to allow for a determination as to whether or not autobuildup can occur. If the character that has been entered is not one of the noted characters, operation 415 passed control back to operation 310 and input of the expression in linear format continues without a determination as to whether or not a portion of the expression can be builtup.

For example, buildup cannot occur after the subscript character "_" is entered because it is necessary for the user to enter the substance of the subscript before buildup of the subscript portion of the expression can be accomplished. Therefore, when control is passed to operation 415 after the subscript character has been entered in operation 310, operation 415 simply passes control back to operation 310 to wait for entry of the next character of the expression rather than passing control to operation 320 for a determination as to whether or not buildup can occur. In this manner, the entry and interpretation of an expression can be optimized because autobuildup determinations occur only when predetermined characters are entered.

In some embodiments, the systems and methods disclosed herein are further enhanced by allowing portions of commonly-used expressions to be automatically entered and builtup. For example, the application Word, which is distributed by Microsoft Corporation of Redmond, Wash., includes an "AutoCorrect" feature that allows a user to automatically expand frequently-used text strings by entering a few identifying characters. A user can use these features to expand commonly-used portions of expressions based on a few keystrokes by the user. The systems and methods disclosed herein can be used to automatically analyze the string that is expanded by the "AutoCorrect" feature and automatically buildup the string, if possible. In this manner, commonly-used portions of expressions can be quickly entered and builtup.

Figure 5:
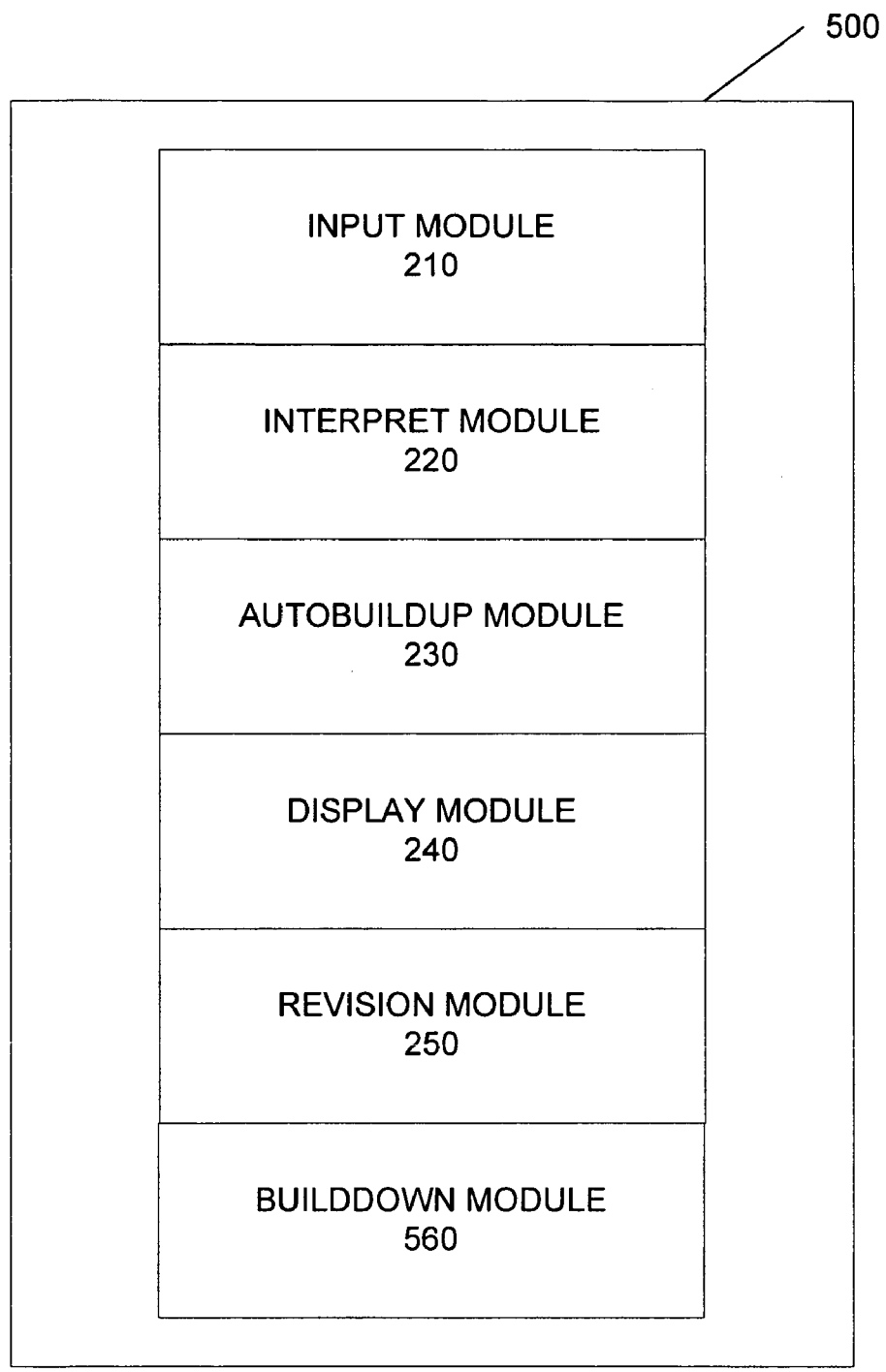
FIG. 5 illustrates another example system for building up and building down an expression.

Referring now to FIG. 5, another example system 500 is shown. System 500 is similar to system 200 described above, in that system 500 includes input module 210, interpret module 220, autobuildup module 230, display module 240, and revision module 250.

System 500 also includes an example builddown module 560. Builddown module 560 is programmed to convert a mathematical expression from a two-dimensional format to a linear format. For example, an expression can be entered in linear format using input module 210 and converted to a two-dimensional format by autobuildup module 230 as described above. In addition, the two-dimensional format can subsequently be converted or builtdown to a linear format by builddown module 560.

For example, builddown module 560 is programmed to builddown Expression B shown above in two-dimensional format to the linear format shown in Expression A. The builddown module 560 can be activated through user input, such as a user's selection of a builddown menu item or button that starts the builddown process. In a similar manner, the linear format of the mathematical expression can subsequently be built back up into the two-dimensional format by autobuildup module 230 in response to the user's selection of a buildup menu item or button that starts the buildup process.

As described above, revision module 250 allows the user to edit the mathematical expression while the expression is shown in the two-dimensional format. For example, the user can modify the two-dimensional representation of the expression by changing alphanumeric characters and symbols in the expression. If the expression is subsequently builtdown to its linear format after revision, the linear format version of the expression can reflect these changes. For example, the user can modify Expression B as shown above to change the numerator of the expression from "a" to "e" to create Expression B" below.

$$y = \frac{e}{b+c} + d \qquad (B'')$$

If Expression B" is subsequently builtdown by builddown module 560, the linear format reflects the changes as shown in Expression A" below.

$$y=e/(b+c)+d \qquad (A'')$$

Some of the modifications made to and attributes associated with an expression while the expression is in its two-dimensional format are not explicitly defined in the linear format. These types of modifications, referred to herein as "special properties," cannot therefore be explicitly reflected in the linear format representation of the expression when the expression is subsequently builtdown. For example, the fraction for one-half can be builtup into one of at least three different two-dimensional representations, including stacked (½) skewed (½), or linear (½). When the user enters one-half in an expression, autobuildup module 220 can be programmed to default to a specific representation, such as stacked. For example, the user can enter in linear format the expression shown below in Expression D.

$$y=½ \qquad (D)$$

Expression D can be builtup into two-dimensional format by autobuildup module 230 into Expression E below, with the fraction shown in a stacked format.

$$y = \frac{1}{2} \qquad (E)$$

Once the expression is builtup into the two-dimensional format of Expression E, the user can modify Expression E using the revision module 250 so that the fraction one-half is, for example, represented as skewed rather than stacked, as shown in Expression E' below.

$$y=½ \qquad (E')$$

When Expression E' is builtdown to linear format by builddown module 560, there is no distinction in the linear format between the stacked and skewed representations of the fraction one-half. Therefore, the linear format for Expression E' is the same as that for Expression E (i.e., Expression D). In other words, both Expression E and Expression E' are builtdown to the same linear format representation as expression in Expression D.

If Expression D is subsequently built back up into two-dimensional format, it is desirable that the fraction one-half is represented as modified by the user in skewed format, rather than the default stacked format. In the example shown, the builddown module 560 is programmed to capture the special property associated with the fraction one-half (i.e., stacked, skewed, or linear) and to associate the special property with the expression in the linear format.

For example, each character of the expression in linear format can be represented according to a character code of the Unicode Standard. See, for example, U.S. patent application Ser. No. 11/196,801, filed on Aug. 2, 2005 and entitled "Mapping Codes for Characters in Mathematical Expressions." The slash character "/" used to represent the fraction bar in the linear format is represented with Unicode character code "002F" in the backing store. Attributes such as special properties can be associated with each character code of the expression. For example, the special property related to the format for the fraction one-half can be associated with character code "002F" used to represent the slash character ("/") in the linear format of Expression D.

In one example, the character codes for each character of the mathematical expression are stored in the backing store as an array or "run." Parallel to this character run are one or more other runs that can, for example, include formatting/attributes for each character of the character run. The special property associated with a given character of the mathematical expression can be stored in one of the formatting runs.

When Equation D is subsequently built back up into two-dimensional format, the special property associated with the division character of Expression D is used to define how the one-half is shown. For example, if the special property indicating "skewed" is associated as an attribute of the character code for the fraction character "/", when Expression D is builtup the result is Expression E' with the skewed fraction one-half, rather than Expression E with the stacked one-half.

Another example of a special property not explicitly defined in linear format is the placement of the limits for an integral. For example, an integral can include limits "x" and "y" that are placed above and below the integral sign as shown in the two-dimensional expression of Expression F below.

$$z = \int_x^y 2n \tag{F}$$

The user can modify Expression F so that the limits "x" and "y" are instead shown as subscripts and superscripts of the integral sign, as shown in Expression F' below.

$$z = \int_x^y 2n \tag{F'}$$

When Expressions F and F' are builtdown to linear format, both Expressions F and F' are identically expressed as shown in Expression G below, since placement of the limits is not explicitly defined in linear format.

$$z = \int\_x\hat{}y2n \tag{G}$$

However, the special property associated with placement of the limits in Expression F' is associated as an attribute of the Unicode character code "222B" in the backing store used to represent the integral character in Expression G. If Expression G is subsequently built back up, the special property associated with the integral character in Expression G is used to correctly place the limits of the integral as shown in Expression F' (i.e., as sub/superscripts, rather than the default above/below).

Examples of special properties that are not explicitly defined in linear format include, but are not limited to, the following:

formatting attributes—e.g., bold, italics, font size, text/background color, animation, under/over/strikeout; and mathematical attributes—e.g., n-ary limit positions, size style, various displacement "tweaks," matrix row and column alignments, stack and box alignments, whether an n-ary operator grows to fit its n-ary, and delimiter vertical alignment and shortfall parameter.

In addition to the categories identified above, other types of special properties can also be used. For example, any property or attribute that is not explicitly defined in linear format can be defined as a special property. Examples of such attributes or properties include: language ID; revision information; footnotes; and comments.

Other special properties not listed above can also be associated with a respective character code in the linear format so that the special property is accurately reflected once the linear format is built back up into two-dimensional format.

Figure 6:
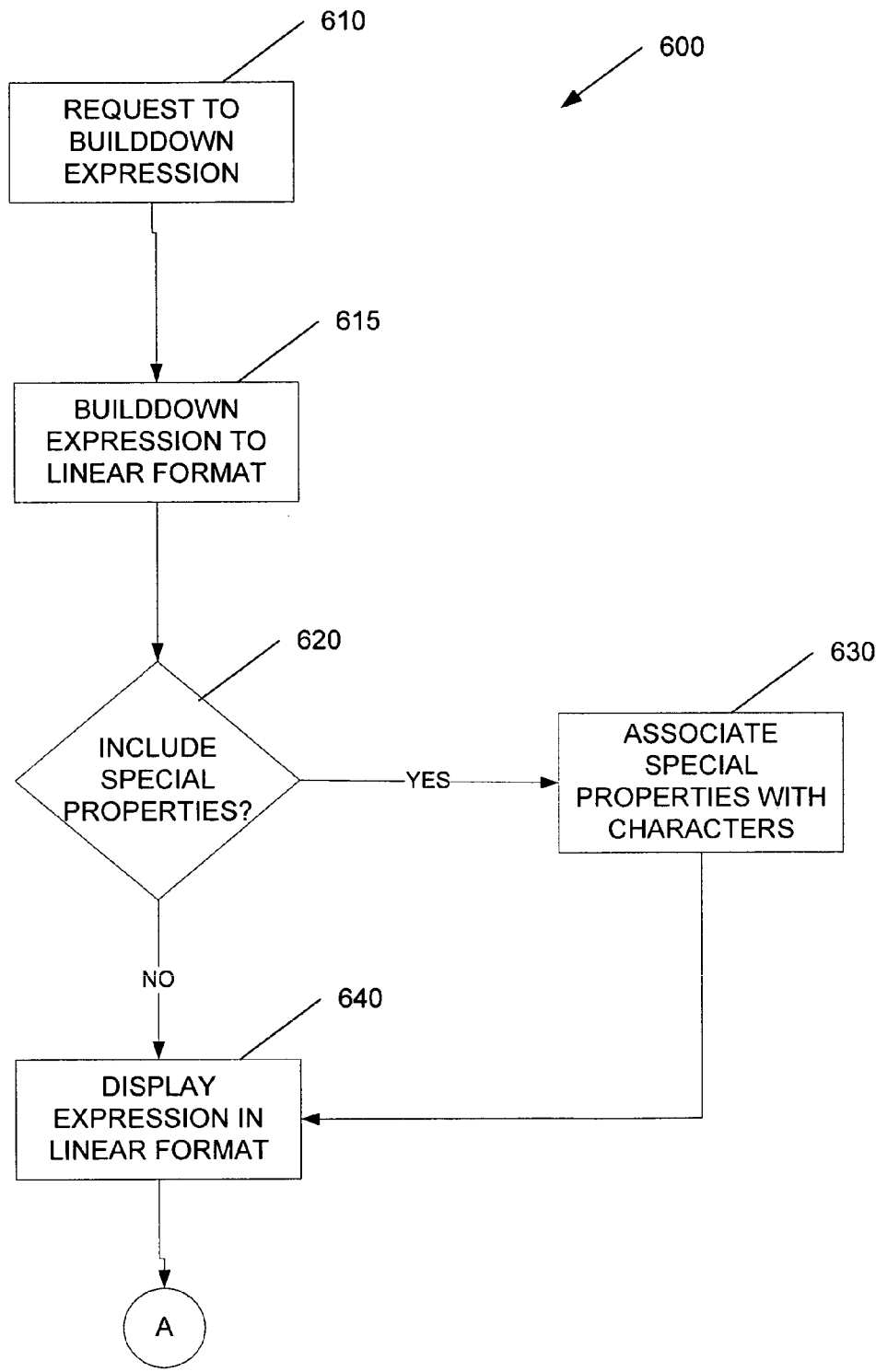
FIG. 6 illustrates an example method for building down an expression.
Figure 7:
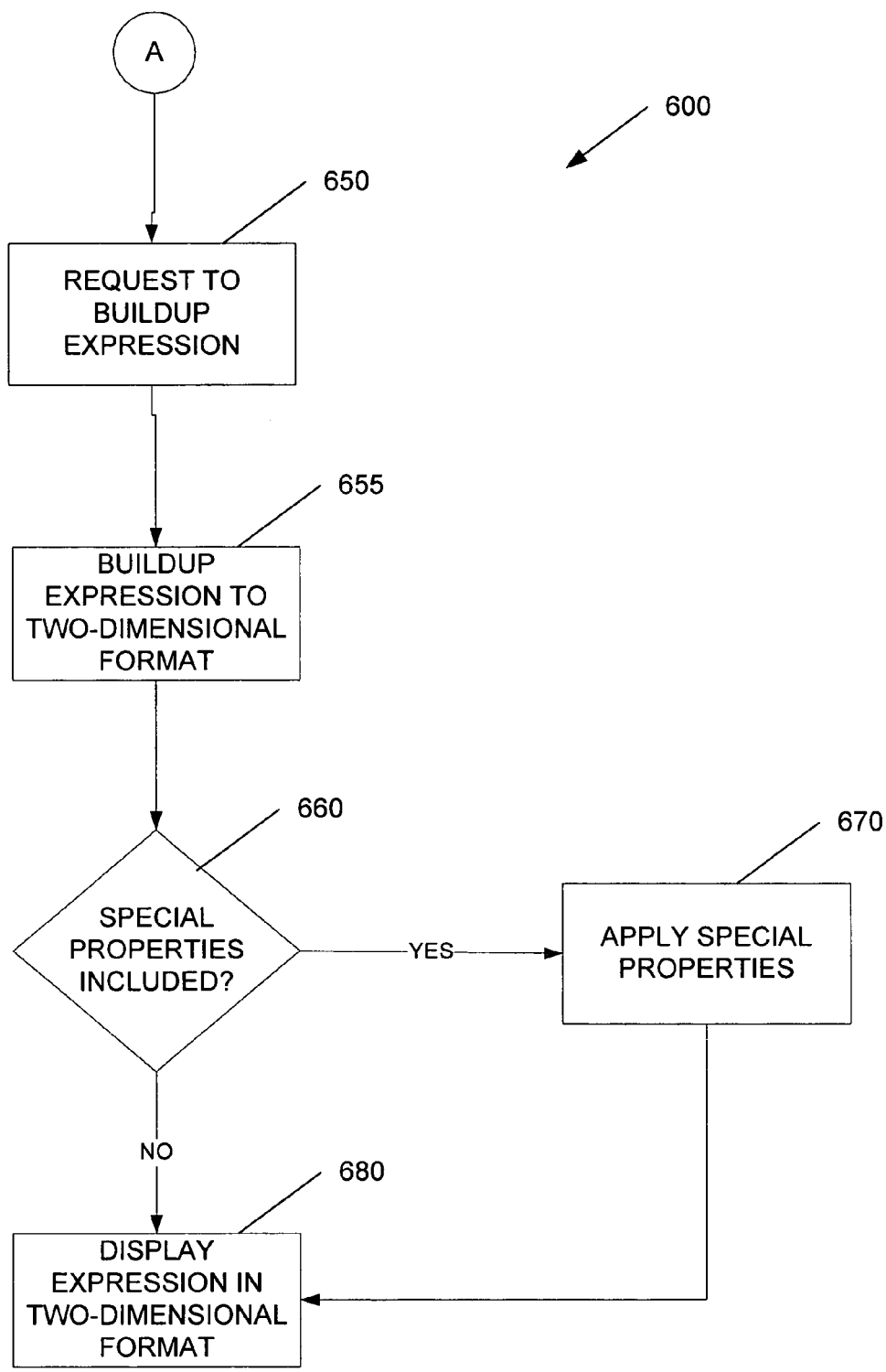
FIG. 7 illustrates an example method for building back up an expression.

Referring now to FIG. 6, an example method 600 for building down an expression from a two-dimensional format to a linear format is shown. At operation 610, a request to builddown the expression is made. For example, in one embodiment the user can request that an expression be builtdown by selecting the expression and then selecting a button or menu item for builddown. In other embodiments, the builddown request can be automated. For example, a global builddown request can be generated to builddown all expressions in one or more documents.

After the request for builddown is made, the process of builddown is initiated at operation 615. During this operation, the two-dimensional format of the expression is builtdown to the corresponding linear format for the expression. In operation 620, a determination is made regarding whether the two-dimensional representation of the expression includes any special properties that are not explicitly defined in the linear format. For example, in one embodiment the expression is examined to identify any attributes that have been defined as special properties. For example, the expression can be examined to determine if the expression includes an integral with limits whose placement is defined as a special property.

If special properties associated with any of the characters of the expression are not found, control is passed to operation 640, and the expression is shown in its linear format. If a determination is made at operation 620 that special properties are associated with one or more of the characters of the expression, control is passed to operation 630. At operation 630, each special property in the two-dimensional representation of the expression is associated as an attribute of the respective character. For example, as described above, placement of the limits for an integral sign can be associated as an attribute of the integral character in the linear format. Next, control is passed to operation 640, and the expression is shown in its linear format.

Referring now to FIG. 6, if the user subsequently wishes to build the expression back up into its two-dimensional format, a request for buildup of the expression is received at operation 650. At operation 655, buildup of the expression is initiated. During this operation, the linear format of the expression is builtup to the corresponding two-dimensional format for the expression. In operation 660, a determination is made regarding whether special properties are associated with any characters of the expression. For example, the arrays or "runs" associated with the characters of the expression can be examined to identify any special properties defined therein for the expression.

If special properties are not included, control is passed to operation 680, and the expression is shown in its two-dimensional format. If a determination is made at operation 660 that special properties are present, control is passed to operation 670. At operation 670, each special property associated as an attribute of a character is identified and applied to the two-dimensional format for the expression. For example, if a special property regarding placement of the limits for an integral character is associated as an attribute of the integral character in the linear format, the special property for placement of the limits is applied when the expression is builtup into two-dimensional format. Next, control is passed to operation 680, and the expression is shown in its two-dimensional format.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

The claimed invention is:

1. A computer system for building down a mathematical expression, the application comprising:
   a processor; and
   a computer-readable storage medium encoding instructions that, when executed by the processor, cause the application to:
   create an input module programmed to accept input of a sequence of characters of the mathematical expression;
   create a builddown module programmed to receive a request to builddown all of the sequence of characters of the entire mathematical expression from a two-dimensional format to a linear format, the builddown module being configured to accept the request to builddown from both a user to builddown the mathematical expression in a first document and an automated global builddown request to builddown all of a plurality of mathematical expressions, including the mathematical expression, in the first document and at least one document other than the first document, the linear format of the mathematical expression including all of the sequence of characters in the linear format, wherein the builddown module is programmed to associate a special property of the two-dimensional format of the entire mathematical expression with a corresponding character of the sequence of characters of the linear format of the entire mathematical expression, wherein the special property is selected from a group consisting of formatting attributes and mathematical attributes, and wherein the special property is associated as a formatting run in a backing store that is stored parallel to a formatting run associated with the corresponding character of the sequence of characters of the linear format; and
   create a formatting module programmed to format the entire mathematical expression upon building the entire mathematical expression back up from the linear format to the two-dimensional format, wherein the formatting module is programmed to apply the special property to the two-dimensional format.

2. The computer system of claim 1, wherein the special property is associated as an attribute of a character code of the corresponding character of the sequence of characters.

3. The computer system of claim 1, further comprising an interpret module programmed to interpret the input and automatically determine when a buildup point is reached.

4. The computer system of claim 1, further comprising a revision module programmed to edit the entire mathematical expression while in the two-dimensional format.

5. The computer system of claim 1, further comprising a display module programmed to display the entire mathematical expression.

6. A method for manipulating an entire mathematical expression entered into a computer system, the method comprising:
   receiving, at the computer system, a single request to builddown all of a sequence of characters of the entire mathematical expression from a two-dimensional format to a linear format, the single request being configured to include an automated global builddown request to builddown all of a plurality of mathematical expressions, including the mathematical expression, in the first document and at least one document other than the first document;
   building down, using the computer system, all of the sequence of characters of the entire mathematical expression to the linear format, the linear format of the mathematical expression including all of the sequence of characters in the linear format; and
   associating, by the computer system, a special property of the two-dimensional format of the entire mathematical expression with a corresponding character of the sequence of characters of the linear format of the entire mathematical expression, wherein the special property is selected from a group consisting of formatting attributes and mathematical attributes, and wherein the associating includes:
      selecting one or more of the mathematical attributes from a list containing at least n-ary position limits, stack and box alignments, and matrix alignments; and
      storing the special property as a formatting run in a backing store that is stored parallel to a formatting run associated with the corresponding character of the sequence of characters of the linear format.

7. The method of claim 6, further comprising associating the special property as an attribute of a character code of the corresponding character of the sequence of characters.

8. The method of claim 6, further comprising:
   building the entire mathematical expression back up from the linear format to the two-dimensional format; and
   applying the special property to the two-dimensional format.

9. The method of claim 6, further comprising:
   inputting the entire mathematical expression in the linear format;
   interpreting the input and automatically determining when a buildup point is reached; and upon reaching the buildup point, automatically formatting at least a portion of the entire mathematical expression into the two-dimensional format.

10. The method of claim 6, further comprising revising the entire mathematical expression while in the two-dimensional format.

11. The method of claim 6, further comprising displaying the entire mathematical expression.

12. A computer-readable storage device comprising a processor and having embedded computer-executable instructions which, when executed by the processor, cause the processor to perform steps comprising:

receiving one of (i) a request to builddown all of a sequence of characters of an entire mathematical expression from a two-dimensional format to a linear format in a first document, and (ii) an automated global builddown request to builddown all of a plurality of mathematical expressions, including the mathematical expression, in the first document and at least one document other than the first document;

building down all of the sequence of characters of the entire mathematical expression to the linear format, the linear format of the mathematical expression including all of the sequence of characters in the linear format; and associating a special property of the two-dimensional format of the entire mathematical expression as an attribute of a character code of a corresponding character of the sequence of characters of the linear format of the entire mathematical expression, wherein the special property is selected from a group consisting of formatting attributes and mathematical attributes and wherein the associating includes:

selecting one or more of the formatting attributes from a list containing at least bold, italics, and under/over/strikeout;

selecting one or more of the mathematical attributes from a list containing at least n-arv position limits, stack and box alignments, and matrix alignments; and storing the special property as a formatting run in a backing store that is stored parallel to a formatting run associated with the corresponding character of the sequence of characters of the linear format.

13. The computer-readable storage device of claim 12, further comprising:

building the entire mathematical expression back up from the linear format to the two-dimensional format; and applying the special property to the two-dimensional format.

14. The computer-readable storage device of claim 12, further comprising:

inputting the entire mathematical expression in the linear format;

interpreting the input and automatically determining when a buildup point is reached; and upon reaching the buildup point, automatically formatting at least a portion of the entire mathematical expression into the two-dimensional format.

15. The computer-readable storage device of claim 12, further comprising revising the entire mathematical expression while in the two-dimensional format.

* * * * *